UNITED STATES PATENT OFFICE.

FRITZ SINGER, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

PROCESS OF MAKING ANTHRAQUINONE.

1,119,546.  Specification of Letters Patent.  Patented Dec. 1, 1914.

No Drawing.  Application filed May 25, 1914.  Serial No. 840,753.

*To all whom it may concern:*

Be it known that I, FRITZ SINGER, citizen of the German Empire, and resident of Offenbach-on-the-Main, in the Grand Duchy of Hesse, Germany, have invented new and useful Improvements in Processes of Making Anthraquinone, of which the following is a specification.

In the application for patent Serial Nr. 810959 filed January 8, 1914, from Fritz Singer and Ernst Milarch, assignors, there is described a process of making anthraquinone, consisting in first treating anthracene with nitric acid at a temperature under 60° C. in presence of an indifferent liquid and in then transforming the intermediate product thus obtained, which is a mixture of unstable meso-nitro derivatives of anthracene, into anthraquinone in presence of nitric acid at higher temperatures than 60° C. Now I have found, that for the second phase of the reaction instead of nitric acid also other oxidizing agents among others in the first line other compounds of nitrogen, containing oxygen, and chlorin can be employed. I have further found, that the addition of salts of mercury for both phases of the process acts very advantageously upon the reaction, realizing a plain progress of the reaction and an important augmentation of the yield of anthraquinone.

In order to illustrate the new process more fully, the following examples are given, parts being by weight.

Example I: 117 parts of anthracene of 85% strength are suspended in 300 parts of nitrobenzene. At 30° while stirring a solution of 3 parts of mercury in 460 parts of nitric acid of 31% strength is poured in 3 hours. Before all the nitric acid is added the mixture is completely dissolved. The impurities, which often are found in technical anthracene, are removed by filtration. The filtered solution is heated at 35° for further 3 hours. Then the nitric acid is separated and 360 parts of nitric acid of 15.6° Bé. are regained. The nitrobenzene solution is treated with a solution of 5 parts of mercury in 55 parts of nitric acid of 40° Bé. and heated at 105°, for instance in 25 minutes. The temperature is rapidly rising at 120°, then at about 110° for nearly 10 minutes chlorin is introduced in the mixture for removing organic compounds of mercury, formed in a little quantity. After cooling down the separated crystals of anthraquinone are filtered, washed with nitrobenzene and benzin and dried.

Example II: 117 parts of anthracene of 85% strength are suspended in 300 parts of nitrobenzene. In 3 hours at 30° a solution of 15 parts of mercury in 460 parts of nitric acid of 31% strength is poured, and the mixture is stirred at 35° for 3 hours and filtered, if necessary. Then the nitric acid is separated. After addition of a solution of a mercury salt a strong stream of chlorin is introduced while stirring in the filtered nitrobenzene solution, and the mixture is heated at 100° for nearly 20 minutes. The temperature is rising while introducing chlorin continuously at 110-120°, the introduction of chlorin and heating is continued for a time. After cooling down the separated crystals of anthraquinone are filtered, washed with nitrobenzene and benzin and dried.

In an analogous manner instead of chlorin the dioxid or trioxid of nitrogen or a mixture of both or other compounds easily developing oxygen, such as manganese peroxid can be used.

Now what I claim and desire to secure by Letters Patent is the following:

The process of making anthraquinone, consisting in first treating anthracene after addition of a mercury salt with nitric acid at a temperature under 60° C. in presence of an indifferent liquid and in then transforming the intermediate product thus obtained, which is a mixture of unstable mesonitro derivitives of anthracene, into anthraquinone by means of an oxidizing agent after addition of a mercury salt at higher temperatures than 60° C.

That I claim the foregoing as my invention, I have signed my name in presence of two witnesses, this sixth day of May 1914.

FRITZ SINGER.

Witnesses:
  PETER LAUTONSCHLÄGER,
  FRITZ DÉSOR.